(12) United States Patent
Missout

(10) Patent No.: US 12,180,856 B2
(45) Date of Patent: Dec. 31, 2024

(54) AERODYNAMIC ARM FOR AN AIRCRAFT TURBINE ENGINE CASING

(71) Applicant: SAFRAN AIRCRAFT ENGINES, Paris (FR)

(72) Inventor: Marc Missout, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/421,226

(22) PCT Filed: Jan. 7, 2020

(86) PCT No.: PCT/FR2020/050018
§ 371 (c)(1),
(2) Date: Jul. 7, 2021

(87) PCT Pub. No.: WO2020/148493
PCT Pub. Date: Jul. 23, 2020

(65) Prior Publication Data
US 2022/0056804 A1 Feb. 24, 2022

(30) Foreign Application Priority Data
Jan. 14, 2019 (FR) ........................................ 1900319

(51) Int. Cl.
*F01D 5/14* (2006.01)
*B33Y 80/00* (2015.01)
(Continued)

(52) U.S. Cl.
CPC .............. *F01D 5/147* (2013.01); *B33Y 80/00* (2014.12); *F01D 5/28* (2013.01); *F01D 9/041* (2013.01);
(Continued)

(58) Field of Classification Search
CPC .................................... F01D 5/147; F01D 5/28
See application file for complete search history.

(56) References Cited

U.S. PATENT DOCUMENTS 4,512,115 A * 4/1985 Miller ....................... F01D 5/20
451/142
4,972,671 A 11/1990 Asselin et al.
(Continued)

FOREIGN PATENT DOCUMENTS

CN 202176550 U 3/2012
CN 103423193 A 12/2013
(Continued)

OTHER PUBLICATIONS

Written Opinion mailed Apr. 17, 2020, issued in corresponding International Application No. PCT/FR2020/050018, filed Jan. 7, 2020, 7 pages.
(Continued)

*Primary Examiner* — Michael L Sehn
(74) *Attorney, Agent, or Firm* — CHRISTENSEN O'CONNOR JOHNSON KINDNESS PLLC

(57) ABSTRACT

An aerodynamic arm for an aircraft turbine engine casing includes a tubular outer shell having a generally elongate shape extending substantially along an axis. The shell has axial ends configured to be connected to a turbine engine casing. An electrically conductive core extends inside the shell and has ends configured to electrically connect to the ends of the shell. An insulating material occupies a space between the core and the shell.

20 Claims, 4 Drawing Sheets

(51) Int. Cl.
 *F01D 5/28* (2006.01)
 *F01D 9/04* (2006.01)
 *F02C 7/20* (2006.01)
 *F02K 3/06* (2006.01)
 *F04D 29/02* (2006.01)
 *F04D 29/54* (2006.01)
 *B33Y 10/00* (2015.01)

(52) U.S. Cl.
 CPC ............... *F02C 7/20* (2013.01); *F02K 3/06* (2013.01); *F04D 29/023* (2013.01); *F04D 29/542* (2013.01); *B33Y 10/00* (2014.12); *F05D 2220/323* (2013.01); *F05D 2230/31* (2013.01); *F05D 2240/12* (2013.01)

(56) References Cited

U.S. PATENT DOCUMENTS

| | | | | |
|---|---|---|---|---|
| 8,087,874 | B2* | 1/2012 | Jardine | F01D 21/045 |
| | | | | 415/189 |
| 9,556,745 | B2* | 1/2017 | Papin | F04D 29/542 |
| 9,562,443 | B2* | 2/2017 | Roberts | F01D 17/02 |
| 9,650,898 | B2* | 5/2017 | Hayford | F02C 3/04 |
| 2007/0217905 | A1 | 9/2007 | Bouiller et al. | |
| 2008/0145694 | A1* | 6/2008 | Bucci | C23C 28/3455 |
| | | | | 427/446 |
| 2012/0266439 | A1 | 10/2012 | Geiger | |
| 2014/0193249 | A1 | 7/2014 | Roberts et al. | |
| 2016/0169049 | A1* | 6/2016 | Eastwood | F01D 25/24 |
| | | | | 415/213.1 |
| 2017/0184124 | A1* | 6/2017 | Moniz | F02C 3/04 |
| 2018/0252231 | A1* | 9/2018 | Northall | F04D 29/544 |
| 2018/0339780 | A1 | 11/2018 | Barone et al. | |

FOREIGN PATENT DOCUMENTS

| | | |
|---|---|---|
| EP | 0 342 087 A1 | 11/1989 |
| EP | 1 811 132 A1 | 7/2007 |

OTHER PUBLICATIONS

International Preliminary Report on Patentability mailed Jun. 16, 2021, issued in corresponding International Application No. PCT/FR2020/050018, filed Jan. 7, 2020, 8 pages.

International Search Report mailed Apr. 17, 2020, issued in corresponding International Application No. PCT/FR2020/050018, filed Jan. 7, 2020, 5 pages.

Written Opinion of the International Searching Authority mailed Apr. 17, 2020, issued in corresponding International Application No. PCT/FR2020/050018, filed Jan. 7, 2020, 7 pages.

Chinese First Office Action mailed Mar. 31, 2023, issued in corresponding Chinese Patent Application No. CN 202080007934.1, filed Jul. 2, 2021, 2 pages.

European Office Action mailed Jul. 20, 2023, issued in corresponding European Patent Application No. 20705409.9, published on Nov. 24, 2021, 5 pages.

Chinese Second Office Action mailed Sep. 12, 2023, issued in corresponding Chinese Patent Application No. CN 202080007934.1, published on Aug. 13, 2021, 2 pages.

* cited by examiner

AERODYNAMIC ARM FOR AN AIRCRAFT TURBINE ENGINE CASING

FIELD OF THE DISCLOSURE

The present disclosure relates to the field of turbine engines. It relates to a casing aerodynamic arm for an aircraft turbine engine.

BACKGROUND

The prior art comprises in particular the documents US-A1-2014/193249 and US-A1-2012/266439.

FIG. 1 shows a double flow turbine engine 1 which comprises, conventionally centred on a longitudinal axis X, a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together form a high-pressure (HP) body. The low-pressure compressor 1a and the low-pressure turbine 1e are connected by a low-pressure shaft 3 and together form a low-pressure (LP) body. The fan S is driven by a fan shaft 4.

The fan S delivers an annular airflow with a central annular part, called primary flow FP, flowing inside a so-called primary duct delimited by an annular fairing 5a, which supplies the engine driving the fan S and an outer annular part, called secondary flow FS, which is ejected into the atmosphere while supplying a significant fraction of the thrust. The fan S is contained in a casing 5b which, together with the annular fairing 5a, delimits a duct so-called secondary in which the secondary flow FS flows.

The hybridisation of turbine engines for aircrafts uses very high electrical power (of about 300 to 500 kVA) compared with the power usually used for the conventional turbine engines for aircrafts (of about 60 kVA).

Despite the increase in the supply voltage (e.g. in the range of 500 V to 1500 V), the supply currents are still considerable for such a power. Consequently, the cross-section of the electrical conductors, which is proportional to the supply current to be transmitted, is also larger. For example, the diameter of the cables is usually of about a few millimetres for conventional turbine engines, but for hybrid turbine engines it is of about several tens of millimetres.

However, in the case of electrical machines designed to be installed under the primary duct of the turbine engine, the electrical conductors must pass through the primary and secondary ducts of the turbine engine in order to convey the electrical energy between the electrical machines installed under the primary duct and the general electrical network of the aircraft. In addition, in the case of electrical machines intended to be installed in an inter-ducts compartment of the turbine engine, also known as the "core area", the electrical conductors must pass through at least the secondary duct. However, with their large cross-section, the electrical conductors constitute an obstacle to the airflow at least in the secondary duct of the turbine engine, thus degrading the inner aerodynamic of the turbine engine and thus compromising the performance of the turbine engine.

It is known to route electrical supply conductors through fixed structural arms, also known as auxiliary passage arms, which pass through at least the secondary duct of the turbine engine. The thickness of such a structural arm is typically greater than 1.5 cm, and more generally greater than 2.5 cm.

As these structural arms are generally hollow and occupied by fluid pipes, the space available to install large cross-section electrical conductors is restricted and does not allow for the flow of large supply currents as required by hybrid turbine engines. In addition, the number of structural arms passing through the secondary duct of the turbine engine is generally small, typically from two to four or five arms, which limits the total supply current that can flow through all the electrical conductors passing through the secondary duct.

The present disclosure proposes to provide a simple and effective solution to the above problems.

SUMMARY

To this end, the disclosure relates to a casing aerodynamic arm for an aircraft turbine engine, characterised in that it comprises:
- an outer tubular shell having a generally elongated shape extending substantially along an axis, this shell comprising axial ends for connecting to a turbine engine casing;
- an electrically conductive core extending inside the shell and having electrical connection ends at each of the ends of the shell; and
- an insulating material configured to occupy a space provided between the core and the shell.

The aerodynamic arm according to the disclosure constitutes a simple and effective solution enabling the passage of large diameter electrical conductors for the passage of high electrical power while preserving the aerodynamic performance of the casing to which it is provided and the mechanical strength without increasing the mass. Indeed, as the aerodynamic arm is intended to be fitted on a turbine engine casing, it is intended to be traversed by an air flow flowing inside the turbine engine. Consequently, it has an aerodynamic profile so as to limit the disturbance of the air flow.

In addition, the aerodynamic arm is tubular and is traversed by a conductive core surrounded by an insulator. Thus, contrary to the solutions of the prior art, the overall volume available inside the arm can be used to pass a large quantity of electrical energy required for the operation of the hybrid turbine engines.

The presence of the insulator between the core and the shell prevents any electrical contact between the conductive core and the outer shell of the arm, thus guaranteeing the integrity of the electrical connections of the turbine engine.

According to the disclosure, for any cross-section of the aerodynamic arm in a plane perpendicular to the axis of the shell, a thickness of the aerodynamic arm is between 2 mm and 10 mm, and a chord length of the aerodynamic arm is between 30 mm and 150 mm.

Advantageously, for any section of the aerodynamic arm in a plane perpendicular to the axis of the shell, the insulating material has a minimum thickness of about 0.8 mm, preferably between 0.6 and 1.5 mm.

Advantageously, for any section of the aerodynamic arm in a plane perpendicular to the axis of the shell, a thickness of the core is between 1 mm and 5 mm.

Advantageously, the ends of the core are configured to be connected by mechanical connections or welds to electrical conductors.

According to an example of embodiment, each of the axial ends of the shell comprises a flange for connecting or for securing to the turbine engine casing.

Thus, each aerodynamic arm can be fitted to a turbine engine casing.

Preferably and advantageously, the insulating material is configured to withstand temperatures of up to 200° C. and is manufactured from a liquid insulator, or an organic insulating powder polymerised by firing, or is configured to withstand temperatures of up to 800° C. and is manufactured from a mixture of a mineral insulating powder and a binder fired at high temperature.

Advantageously, the mineral insulating powder is Kapton©, Teflon® or magnesia resistant to the high temperatures of the environment of the turbine engines.

Advantageously, the binder is a ceramic binder.

The present disclosure also relates to an aircraft turbine engine, characterised in that it comprises at least ten aerodynamic arms having at least one of the aforementioned characteristics, and preferably at least twenty aerodynamic arms, each aerodynamic arm being part of a flow rectifier blading which passes through a secondary flow duct or a primary flow duct of the turbine engine.

The turbine engine according to the disclosure has the advantage of integrating and passing a greater amount of electrical energy through several (at least ten) aerodynamic arms of reduced dimensions. Thus, at least ten aerodynamic arms of reduced thickness are configured to be provided on a casing of the turbine engine, while preserving the mechanical strength and without increasing the mass of this casing. This may also allow to avoid the use of voluminous arms for passing a high electrical power.

The present disclosure finally relates to a manufacturing method for making an aerodynamic arm according to the disclosure, this method comprising the steps of:
  a) manufacturing the electrically conductive core;
  b) manufacturing the shell;
  c) positioning the core relative to the shell providing a space;
  d) adding the insulating material to the space provided between the shell and the electrically conductive core;
  e) hardening the insulating material to ensure the connection with the shell and the electrically conductive core.

The method according to the disclosure may comprise one or more of the following characteristics, taken alone or in combination with each other:
  in the step b), the shell is manufactured by additive manufacturing;
  the steps b) and c) are carried out simultaneously, by manufacturing the shell directly around the core;
  the core and an inner surface of the shell are manufactured simultaneously by additive manufacturing;
  in the step c), the insulating material is either in the form of liquid insulator or an insulating powder, or in the form of a mixture of mineral insulating powder and binder;
  the step c) further comprises either a polymerisation of the liquid insulator or the insulating powder or a firing of the mixture of mineral insulating powder and binder.

DESCRIPTION OF THE DRAWINGS

Further characteristics and advantages of the disclosure will become apparent from the following detailed description, for the understanding of which reference is made to the appended drawings in which.

DETAILED DESCRIPTION

In this disclosure, the terms "upstream", "downstream" are used in reference to the flow direction of the gas in an aircraft turbine engine. The terms "inner" and "outer" are defined with respect to a longitudinal axis of the turbine engine. The terms "axial", "inside" and "outside" are defined with reference to the positioning of the components constituting the aerodynamic arm according to the disclosure.

Figure 1:
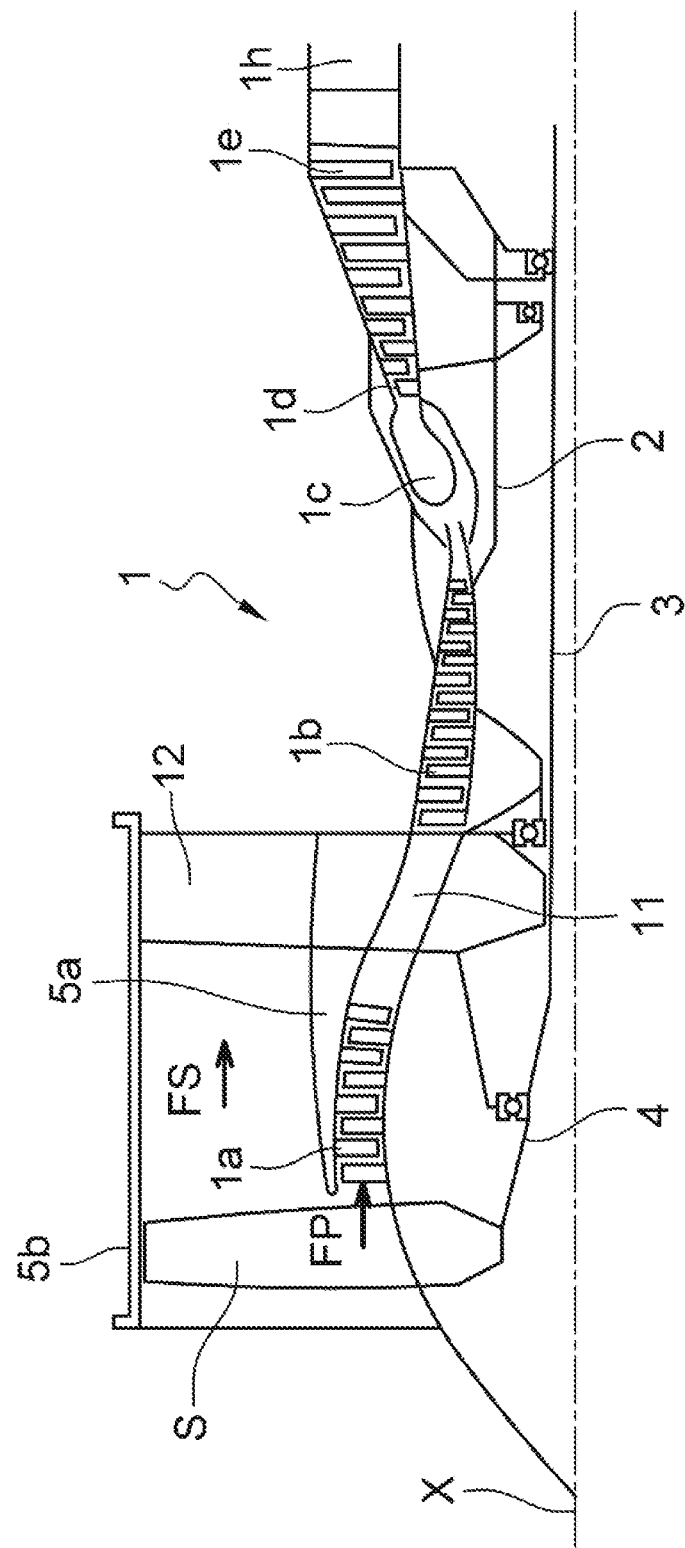
FIG. 1, already discussed, is a schematic cross-sectional view of a turbine engine.
Figure 2:
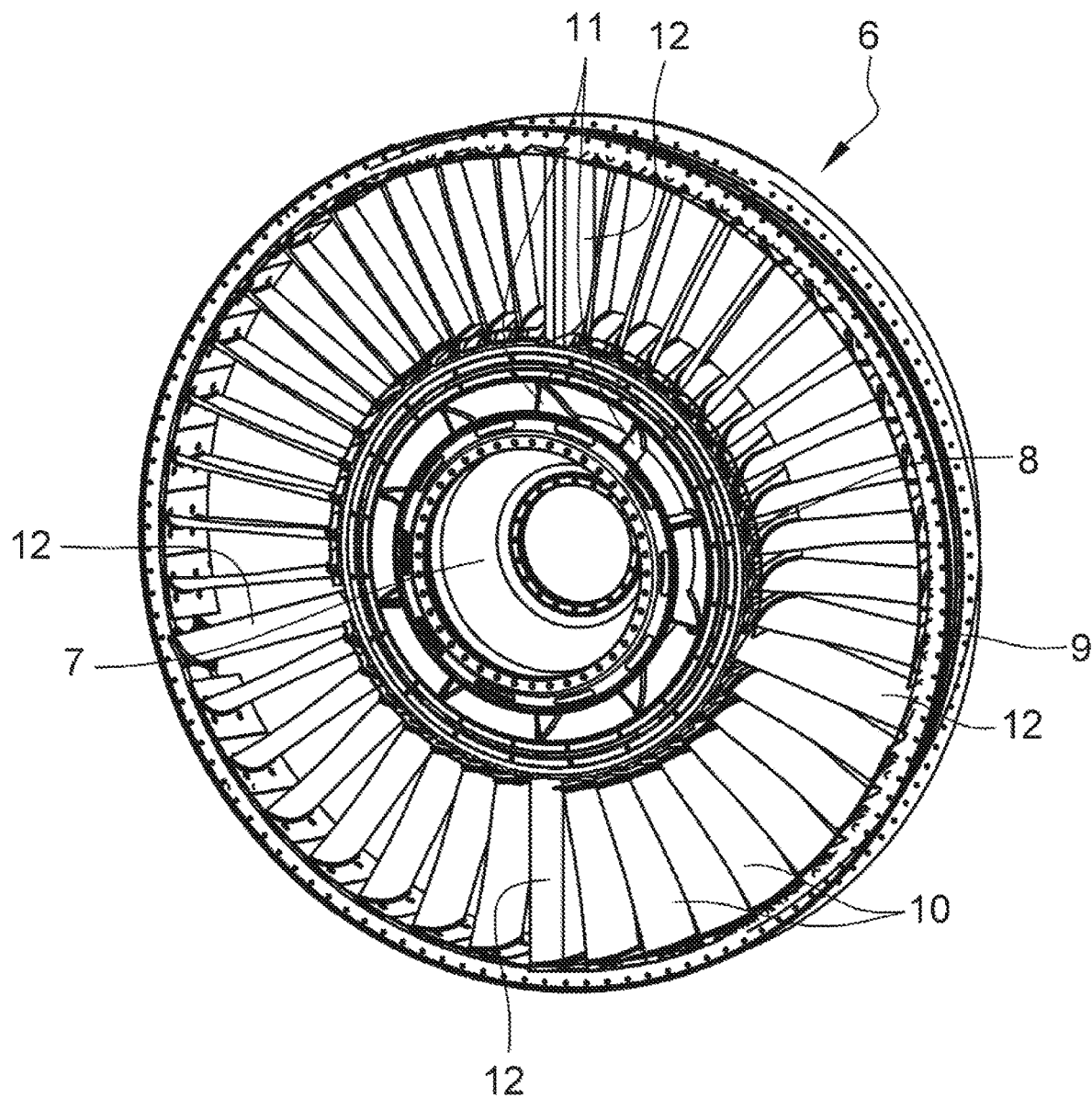
FIG. 2 is a perspective view of a turbine engine casing.

With reference to FIG. 2, a structural element of the turbine engine 1 designated intermediate casing 6 comprising two coaxial annular rows of blading constituting an inner blading located in the primary flow FP and an outer blading located in the secondary flow FS. More precisely, the intermediate casing 6 comprises a hub 7 intended to be traversed by the LP shaft 3, an inner ring gear 8 for separating the primary FP and secondary FS flows, an outer annular shroud 9 located at the level of a nacelle of the turbine engine, radial aerodynamic arms 10 in the form of fins extending radially between the ring gear 8 and the outer shroud 9 and inner radial connecting arms 11 between the hub 7 and the ring gear 8. The arms 10 form the outer blading and the arms 11 form the inner blading. Radial arms 12 may also be arranged in the outer blading and transmit a part of the forces between the engine and its support, the arms 12 being structural arms. The arms 10 of the intermediate casing can take the form of flow rectifier vanes to rectify the secondary flow FS flowing in the secondary duct, in the axis X of the turbine engine 1 downstream the fan S. The arms 10 then constitute OGV, which is the acronym for Outlet Guide Vane. A ring gear of fixed fins (not shown) is generally arranged between the fan S and the arms 11 of the intermediate casing, to rectify the primary flow FP flowing in the primary duct, in the axis X of the turbine engine 1. These fins are generally referred to as IGV, which is the acronym for Inlet Guide Vane.

The intermediate casing 6 has a structural function insofar as the forces are transmitted through it; in particular, the means for securing the turbine engine 1 to the aircraft structure are integral with the intermediate casing 6.

Figure 3:
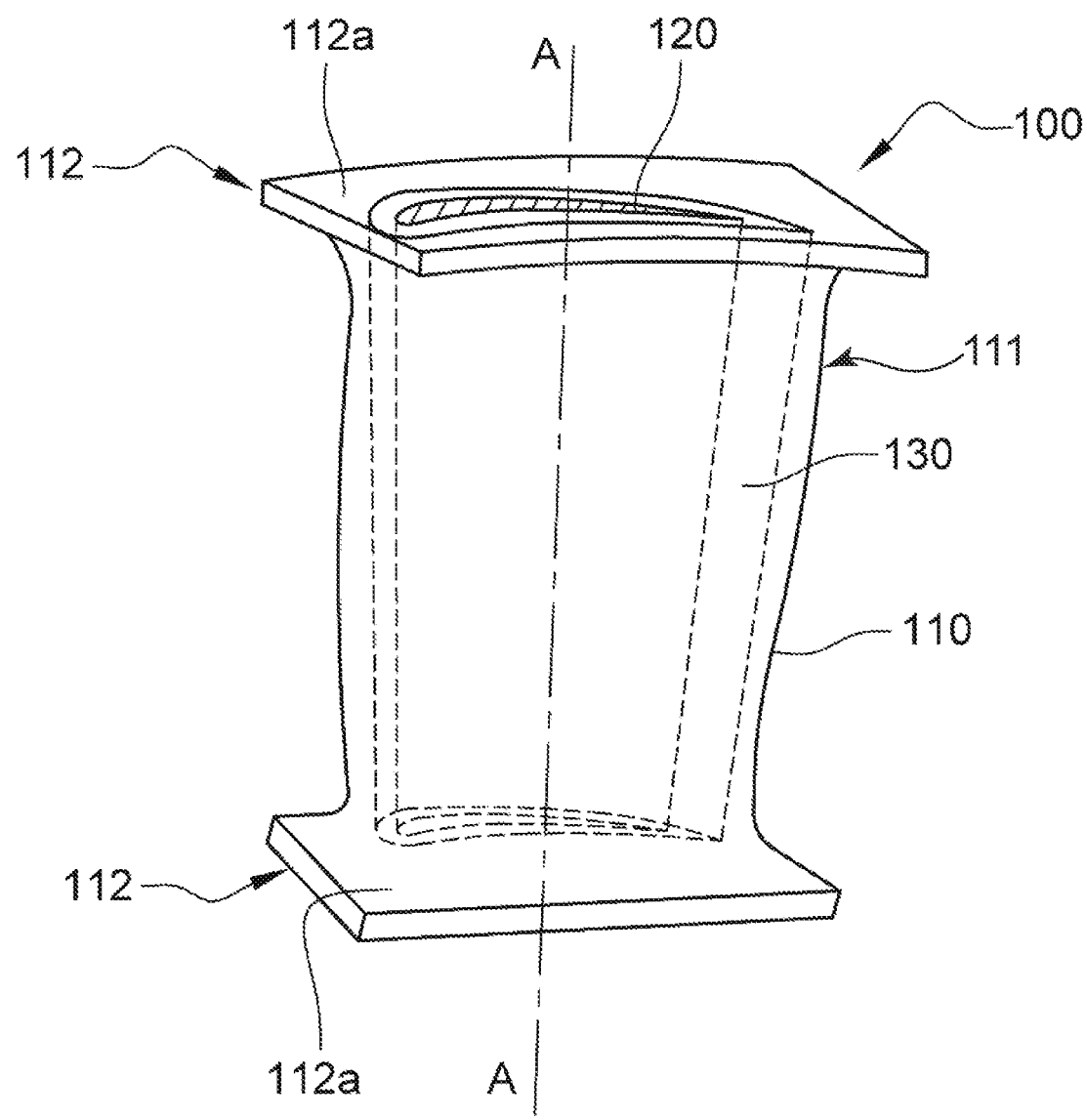
FIG. 3 is a detail view of an example of embodiment of an aerodynamic arm according to the disclosure.
Figure 4:
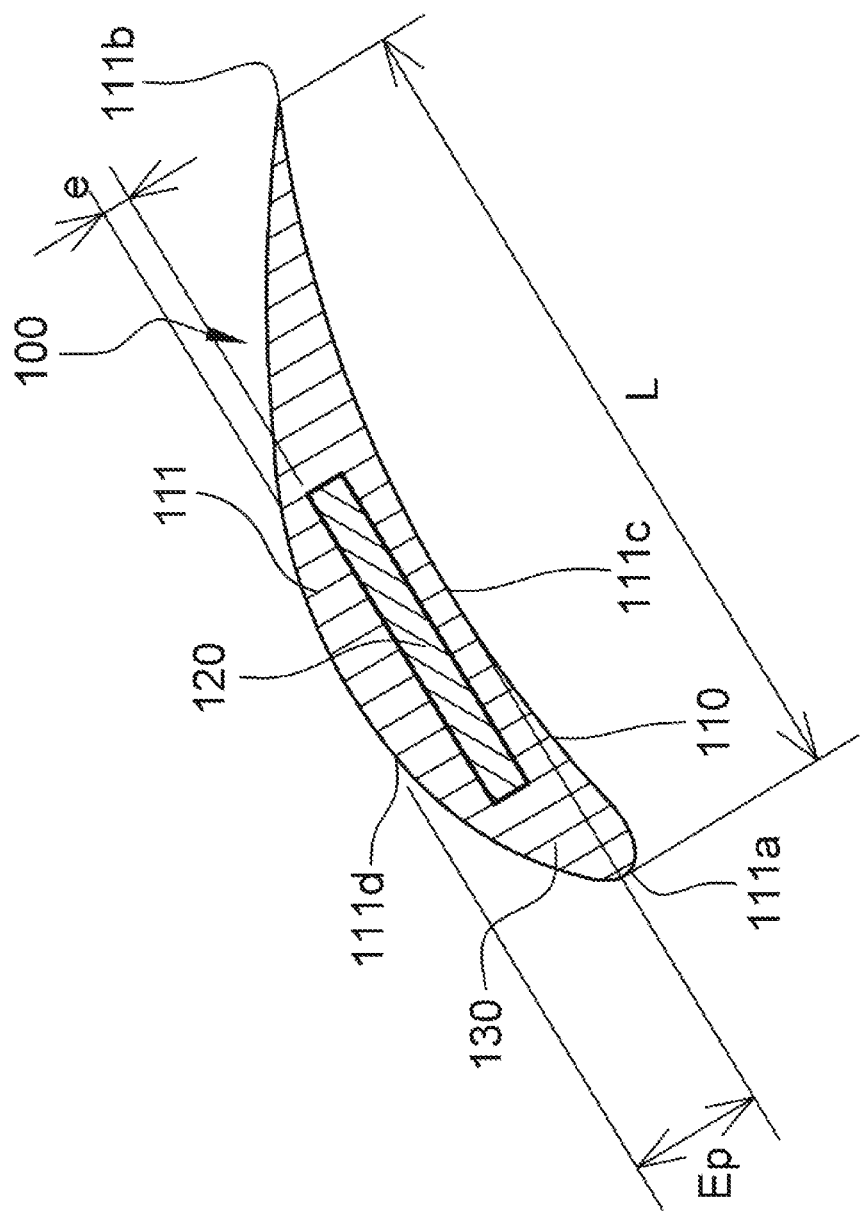
FIG. 4 is a cross-sectional view of the aerodynamic arm illustrated in FIG. 3.

An example of embodiment of the aerodynamic arm 100 according to the disclosure is illustrated in FIGS. 3 and 4.

The aerodynamic arm 100 comprises:
  an outer shell 110;
  an electrically conductive core 120; and
  an insulating material 130.

The shell 110 is tubular. It has a tubular body 111 of generally elongated shape extending substantially along an axis A-A and axial ends 112 for connecting to a casing, such as for example an intermediate casing 6 of the turbine engine 1.

The electrically conductive core 120 and the insulating material 130 are enclosed within an inner cavity delimited by an inner surface of the shell 110.

In cross-section, the body 111 of the shell 110 has an aerodynamic profile as seen in FIG. 4. The body 111 thus has a leading edge 111a, a trailing edge 111b, an intrados 111c and an extrados 111d.

The aerodynamic arms 100 according to the disclosure are configured to be provided on a casing, in particular an intermediate casing for an aircraft turbine engine. For this purpose, each of the axial ends 112 of the shell 110 comprises a flange 112a for connecting or securing to the casing.

Thus, each aerodynamic arm can be fitted to the intermediate casing 6, for example by welding the flanges 112*a* of the shell 110 to the inner ring gear 8 and the outer shroud 9 of the casing of the turbine engine.

The shell 100 is made of any material with the required abrasion resistance properties. It is made of metal, for example.

The shell 100 has a thickness that guarantees the mechanical strength of the aerodynamic arm 100.

The core 120 extends along the axis A-A inside the shell 110. It has electrical connection ends (not shown) at each of the ends 112 of the shell 110. The electrical connection ends of the core 120 are configured to be coupled by mechanical connections or welds to electrical conductors of the turbine engine, either for example to the general electrical network of the aircraft or to electrical machines installed under the primary duct.

The electrical connection ends of the core 120 are either protrusions of the core 120, or separate elements that can be fitted by screwing to the ends of the core 120 when the arms 100 are mounted on the casing 6 (for example by means of lugs).

The core is made of any electrically conductive material. For example, it is made of copper or aluminium, depending on the ambient temperature of the environment in which the aerodynamic arms 100 are installed. The core 120 may be, for example, constituted of a metal strip with a rectangular cross-section (as shown in FIG. 4), with a width (thickness of the rectangular cross-section strip) of between 1 mm and 3 mm and a cross-section length of between 10 mm and 50 mm. In the event that the electrical connection ends of the core 120 comprise mechanical connections for coupling to electrical conductors of the turbine engine, these mechanical connections may be formed with the core 120 by machining, moulding, or additive manufacturing.

The insulating material 130 suitable for occupying the space provided between the core 120 and the shell 110 may be chosen according to the ambient temperature of the environment in which the aerodynamic arms 100 are installed.

According to an example of manufacturing, the insulating material 130 may be obtained from either a liquid insulator or an organic insulating powder polymerised by firing, the insulating material thus being configured to withstand temperatures of up to 200° C.

According to another example of manufacturing, the insulating material 130 may be obtained from a mixture of a mineral insulating powder and a binder fired at high temperature, the insulating material thus being configured to withstand temperatures of up to 800° C.

The mineral insulating powder may be Kapton© or Teflon® which have very good dielectric properties and a good temperature resistance which can withstand temperatures of up to 200° C.

The mineral insulating powder can also be magnesia or aluminium oxide. The mineral insulating powder has better high temperature resistance properties. In combination with a ceramic binder such as, for example, the mineral insulating powder can withstand temperatures of up to 800° C.

Thus, for temperatures in the range of 200° C. to 300° C., the binder may be a thermosetting polymer resin, and for higher temperatures, the binder may be an oxide composite in slip form, such as the Ox/Ox.

The shape of the shell 110 is thus adapted to the flow of the air flow in the turbine engine 1 during operation, the aerodynamic profile of the shell 110 thus providing a rectifying function for the flow of the air in the primary and secondary ducts.

The arms 100 can thus take on the appearance of flow rectifier vanes thus ensuring a flow rectifying function downstream of the fan S, in the primary duct they can constitute IGV, or in the secondary duct they can constitute OGV, the conduction function of the electrical energy then being ensured by parts having an aerodynamic role.

The aerodynamic arms 100 thus have, in the configuration of the disclosure, both an aerodynamic function of rectifying the secondary flow of air coming from the fan S in the axis X of the turbine engine and an electrical conduction function, with possibly a structural function if at least some of the arms are provided with sufficient thickness and/or rigidity to participate in the mechanical strength of the assembly formed by the arms and shrouds or ring gears between which the arms extend radially. Thus, in accordance with the disclosure, in an advantageous manner with respect to the arms of the prior art, the volume available inside the arms 100 is used to pass electrical energy through the primary and secondary ducts, between the general electrical network of the aircraft and electrical machines installed under the primary duct.

Thus, an aircraft turbine engine comprising a plurality of arms 100 according to the disclosure, allows the passage of a significant total electrical current between the electrical machines and the general electrical network of the aircraft while maintaining good performance.

The proposed solution applies in particular to turbine engines for aircrafts in which, in order to pass a large electrical current through a primary or secondary flow duct, it is necessary in the prior art to install large diameter electrical conductors, for example greater than 5 mm, in auxiliary passage arms.

An aircraft turbine engine according to the disclosure thus comprises at least ten aerodynamic arms 100 and, preferably, at least twenty aerodynamic arms 100. Each aerodynamic arm 100 is part of an assembly of OGV or IGV constituting rectifier bladings of a flow which traverse, respectively, through a secondary flow duct or a primary flow duct of the turbine engine downstream of a fan.

The aircraft turbine engine according to the disclosure comprises, even more preferably, between 30 and 70 aerodynamic arms 100 according to the disclosure, this number varying according to the type of engine of the turbine engine.

For any section of the aerodynamic arm 100 in a plane perpendicular to the axis A-A of the shell 110, a maximum thickness Ep of the aerodynamic arm 100 is preferably between 2 mm and 10 mm, and a chord length L of the aerodynamic arm 100 is preferably between 30 mm and 150 mm.

For any cross-section of the aerodynamic arm 110 in a plane perpendicular to the axis A-A of the shell 110, a thickness of the core 120 is preferably between 1 mm and 5 mm.

According to an interesting example of manufacturing, but by no means limiting, one seeks to make a current of 1.8 kA flow through all the aerodynamic arms 100 (corresponding to a power of 1 MW under a supply voltage of 540V of the turbine engine), which requires a total conductor section of 10 cm². In the case of a turbine engine comprising 66 aerodynamic arms 100, this corresponds to a cross-section of the electrically conductive core 120 of about 15 mm², i.e. for a core 120 with a rectangular cross-section as illustrated in FIG. 4, a width of 1 mm and a length of 15 mm. However, the electrically conductive core 120 may have a cross-section of any shape, and in particular a shape relatively identical to that of the shell 110 of the aerodynamic arm 100.

The minimum thickness e to be respected of the insulating material 130 between an outer surface of the core 120 and the inner surface of the shell 110 depends on the supply voltage of the turbine engine. Thus, for a supply voltage of 540 V, the insulating material 130 has a minimum thickness e of about 0.8 mm. More generally, the minimum thickness e will be preferably between 0.6 mm and 1.5 mm.

Thus, for such a configuration, the aerodynamic arm 100 has, for example, a thickness Ep of about 5 mm and a total chord length L of between 60 mm and 80 mm.

The method of manufacturing the aerodynamic arm 100 according to the disclosure comprises the following steps:
  a) manufacturing the electrically conductive core 120;
  b) manufacturing the shell 110;
  c) positioning the core 120 relative to the shell 110 providing a space;
  d) adding the insulating material 130 to the space provided between the shell 110 and the electrically conductive core 120;
  e) hardening the insulating material 130 to ensure the connection with the shell 110 and the electrically conductive core 120.

As described below, the core 120 may be manufactured before or after the shell 110, or simultaneously; and the step of hardening the insulating material 130 differs depending on the type of insulating material 130 used.

According to an interesting, but by no means limiting, example of manufacturing, the aerodynamic arm 100 according to the disclosure is made by a method comprising the following steps:
  the core 120 is manufactured by any method known per se, such as, for example, by a drawing, machining, stamping method, . . . ;
  the core 120 is then positioned on an additive manufacturing support plate;
  the shell 110 is then manufactured by additive manufacturing, around the electrically conductive core 120, by providing a space between an outer surface of the electrically conductive core 120 and an inner surface of the shell 110;
  the space provided between the outer surface of the electrically conductive core 120 and the inner surface of the shell 110 is filled with the insulator, which may be in the form of either a liquid insulator or an organic insulating powder, or a mixture of mineral insulating powder and binder, for example ceramic;
  the assembly is then heated, this step allowing either to polymerise the insulator in the case of a liquid insulator or an organic insulating powder, or to fire the insulator in the case of a mixture of mineral insulating powder and binder, for example ceramic, in order to bind the powder and the binder, so as to form the insulating material 130.

According to another embodiment, when the insulating material 130 is in a liquid state at the time it is cast between the conductive core 120 and the shell 110, this liquid state is obtained either by melting the insulating material (in the case of a thermoplastic insulator) or by nature (in the case of a ceramic insulator). The insulating material is then converted to a solid state either by cooling or by firing the ceramic slip, for example in a furnace provided for this purpose.

The choice of the one or the other solution depends on the temperature at which the aerodynamic arm 100 will be required to operate, in other words, according to the type of turbine engine on which it will provided (a thermoplastic type insulating material will not withstand a temperature above 100° C., for example).

The shell 110, and consequently the arm 100, may have complex inner and outer shapes due to the presence of several degrees of curvature giving it a twisted appearance around the axis A-A. The shell 110 may be made by LMD (acronym for Laser Metal Deposition) additive manufacturing technology, which involves using a laser beam to generate a layer of molten material on a metallic material, to which material is then added to fuse and grow the layer, the addition being made, for example, in the form of a powder or a wire constituted of the material. In this way, the laser fuses the surface of the component being manufactured with the additional material added, layer by layer.

In this way, the shell 110 is made directly around the electrically conductive core 120, providing a space between the outer surface of the electrically conductive core 120 and the inner surface of the shell 110 to receive the insulating material 130. The aforementioned steps b) and c) being then carried out simultaneously.

On a same plate of an additive manufacturing system, it is possible to provide the simultaneous manufacture of several aerodynamic arms 100, in order to improve the productivity of the manufacturing method.

It is also envisaged that the shell 110, and hence the arm 100, have substantially straight (non-twisted) inner and outer shapes. In this case, the shell 100 can be manufactured by any method known per se, such as for example by the SLM (acronym for Selective Laser Melting) additive manufacturing technology, consisting of fusing the powder by means of a high-energy beam such as a laser beam. In practice, a powder bed is deposited on a support plate and scanned by the laser beam to selectively melt the powder, thereby manufacturing a part layer by layer, with a third layer of melted powder being arranged on top of a second layer which is itself arranged on top of a first layer.

The core 120 is then fitted inside the resulting shell 110, providing a space between the outer surface of the core 120 and the inner surface of the shell 110. This space is then filled as described above and the assembly is heated to form the insulating material 130.

It is also possible to make both the electrically conductive core 120 and the inner surface of the shell 110 by additive manufacturing. In particular, the LMD technology allows to make two parts together, each made of a different metallic material, for example from two wire coils constituted of the two materials.

Furthermore, in any case, in order to limit the aerodynamic load loss, the method for manufacturing the aerodynamic arm 100 according to the disclosure may still comprise a step of polishing an outer surface of the shell 100.

Furthermore, the additive manufacturing technique allows to create a shell 110 with doubly complex shapes, namely at the outer surface and the inner surface of the shell 110.

The invention claimed is:

1. A double flow aircraft turbine engine, comprising a casing having:
  two coaxial annular rows of blading constituting an inner blading located in a primary flow duct of the double flow aircraft turbine engine and an outer blading located in a secondary flow duct of the double flow aircraft turbine engine and
  at least ten aerodynamic arms, each aerodynamic arm being part of a flow rectifier blading that passes through one of the secondary flow duct and the primary flow duct, each aerodynamic arm comprising:

an outer tubular shell having a generally elongated shape extending substantially along an axis (A-A), the outer tubular shell comprising axial ends configured to connect to a casing of the turbine engine;

an electrically conductive core extending inside the outer tubular shell and having electrical connection ends at each of the ends of the outer tubular shell; and an insulating material configured to occupy a space provided between the electrically conductive core and the outer tubular shell, wherein for any cross-section of the aerodynamic arm in a plane perpendicular to the axis (A-A) of the outer tubular shell, a maximum thickness (Ep) of the aerodynamic arm is between 2 mm and 10 mm, and a chord length (L) of the aerodynamic arm is between 30 mm and 150 mm, wherein each aerodynamic arm is located in the secondary flow duct with the outer blading.

2. The double flow aircraft turbine engine according to claim 1, wherein the insulating material has a minimum thickness (e) between 0.6 mm and 1.5 mm.

3. The double flow aircraft turbine engine according to claim 1, wherein a thickness of the electrically conductive core is between 1 mm and 5 mm.

4. The double flow aircraft turbine engine according to claim 1, wherein the ends of the electrically conductive core are configured to be connected to electrical conductors by one of mechanical connections and welds.

5. The double flow aircraft turbine engine according to claim 1, wherein each axial end of the outer tubular shell comprises a flange configured to connect to the casing of the turbine engine.

6. The double flow aircraft turbine engine according to claim 1, wherein the insulating material is configured to withstand temperatures of up to 200° C. and is made from one of a liquid insulator and an organic insulating powder polymerized by firing, or is configured to withstand temperatures of up to 800° C. and is manufactured from a mixture of a mineral insulating powder and a binder fired at high temperature.

7. The double flow aircraft turbine engine according to claim 6, wherein the mineral insulating powder is one of KAPTON and TEFLON.

8. The double flow aircraft turbine engine according to claim 6, wherein the binder is a ceramic binder.

9. The double flow aircraft turbine engine according to claim 6, wherein the mineral insulating powder is magnesia or aluminum oxide.

10. The double flow aircraft turbine engine according to claim 1, wherein the insulating material is configured to withstand temperatures of up to 800° C. and is manufactured from a mixture of a mineral insulating powder and a binder fired at high temperature.

11. The double flow aircraft turbine engine according to claim 1, wherein the electrical connection ends are either protrusions of the electrically conductive core, or the electrical connection ends are separate elements and configured to be fitted by screwing to ends of the electrically conductive core when the aerodynamic arms are mounted on the casing.

12. The double flow aircraft turbine engine according to claim 1, wherein the electrically conductive core is constituted of a metal strip with a rectangular cross-section and said metal strip having a width between 1 mm and 3 mm and a cross-section length between 10 mm and 50 mm.

13. The double flow aircraft turbine engine according to claim 1, wherein the electrically conductive core is made of copper or aluminum, and wherein said two coaxial annular rows comprises an outer annular row having the aerodynamic arms and the outer blading extending circumferentially around the axis (A-A).

14. The double flow aircraft turbine engine according to claim 1, wherein the casing comprises a hub configured to be traversed by a low-pressure shaft of the double flow aircraft turbine engine, an inner ring gear for separating the primary flow duct and the secondary flow duct, an outer annular shroud located at the level of a nacelle of the turbine engine.

15. A manufacturing method for making a casing aerodynamic arm according to claim 1, the method comprising the steps of:
a) manufacturing the electrically conductive core;
b) manufacturing the shell;
c) positioning the core relative to the shell by providing a space;
d) adding the insulating material to the space provided between the shell and the electrically conductive core; and
e) hardening the insulating material to ensure the connection with the shell and the electrically conductive core.

16. The method according to claim 15, wherein the shell is manufactured by additive manufacturing.

17. The method according to claim 15, wherein the steps b) and c) are carried out simultaneously by manufacturing the shell directly around the core.

18. The method according to claim 15, wherein the core and an inner surface of the shell are manufactured simultaneously by additive manufacturing.

19. The method according to claim 15, wherein the insulating material is one of liquid insulator, an insulating powder, and a mixture of mineral insulating powder and binder.

20. The method according to claim 19, wherein the step c) further comprises one of a polymerization of the liquid insulator, a polymerization of the insulating powder, and a firing of the mixture of mineral insulating powder and binder.

* * * * *